United States Patent
Matsuoka et al.

(10) Patent No.: US 8,231,997 B2
(45) Date of Patent: Jul. 31, 2012

(54) ELECTROLYTE MEMBRANE-ELECTRODE MEMBRANE ASSEMBLY FOR SOLID POLYMER FUEL CELL AND PRODUCTION METHOD THEREOF, AND FUEL CELL EQUIPPED THEREWITH

(75) Inventors: Hitoshi Matsuoka, Yamaguchi (JP); Kenji Fukuta, Yamaguchi (JP)

(73) Assignee: Tokuyama Corporation (JP)

( * ) Notice: Subject to any disclaimer, the term of this patent is extended or adjusted under 35 U.S.C. 154(b) by 669 days.

(21) Appl. No.: 12/096,905

(22) PCT Filed: Dec. 20, 2006

(86) PCT No.: PCT/JP2006/325338
§ 371 (c)(1), (2), (4) Date: Jul. 24, 2009

(87) PCT Pub. No.: WO2007/072842
PCT Pub. Date: Jun. 28, 2007

(65) Prior Publication Data
US 2009/0305110 A1 Dec. 10, 2009

(30) Foreign Application Priority Data
Dec. 20, 2005 (JP) .................................. 2005-366462

(51) Int. Cl.
*H01M 4/08* (2006.01)
*H01M 2/14* (2006.01)
*H01M 2/16* (2006.01)

(52) U.S. Cl. ........ 429/122; 429/188; 429/314; 429/316; 429/507; 429/523; 429/530; 429/535

(58) Field of Classification Search .................. 429/122, 429/188, 314, 316, 507, 523, 530, 535
See application file for complete search history.

(56) References Cited

U.S. PATENT DOCUMENTS
2005/0042489 A1 2/2005 Fukuta et al. .................. 429/30

FOREIGN PATENT DOCUMENTS

| JP | 11-144745 | 5/1999 |
| JP | 2005-032536 | 2/2005 |
| JP | 2005-050607 | 2/2005 |
| JP | 2006-010241 | 1/2006 |
| JP | 2007-042573 | 2/2007 |
| JP | 2007-042617 | 2/2007 |

OTHER PUBLICATIONS

International Search Report for PCT/JP2006/325338, mailed Mar. 27, 2007, (5 pgs.).

*Primary Examiner* — Timothy J. Kugel
(74) *Attorney, Agent, or Firm* — Squire Sanders (US) LLP

(57) ABSTRACT

An object of the present invention is to provide an electrolyte membrane-electrode membrane assembly for a solid polymer fuel cell having superior characteristics, wherein a gas diffusion electrode membrane and a solid electrolyte membrane are well bonded, and electrode catalysts are uniformly-dispersed to obtain high electrode activity, a production method thereof and a fuel cell equipped therewith.

The electrolyte membrane-electrode membrane assembly of the present invention is produced by jointing a molded membrane for forming a gas diffusion electrode membrane formed by a paste composition including a polymeric organic compound having a quaternary base forming functional group and an electrode catalyst, with a quaternary base anion-exchange resin precursor membrane for forming a solid electrolyte membrane having a quaternary base forming functional group; forming of a quaternary base anion-exchange group by bonding a polyfunctional quaternarizing agent to the quaternary base forming functional group included in each of said molded membrane and said precursor membrane via each functional group of the polyfunctional quaternarizing agent which is present around the bonded interface of both membranes to thereby crosslink the formed anion-exchange resins in both membranes via the polyfunctional quaternarizing agent simultaneously; and subjecting the non-quaternarized residue of the quaternary base forming functional groups in thus-obtained assembly to a quaternary base forming treatment.

A fuel cell comprising thus-produced electrolyte membrane-electrode membrane assembly is excellent in bonding property, durability and output voltage.

11 Claims, 1 Drawing Sheet

ELECTROLYTE MEMBRANE-ELECTRODE MEMBRANE ASSEMBLY FOR SOLID POLYMER FUEL CELL AND PRODUCTION METHOD THEREOF, AND FUEL CELL EQUIPPED THEREWITH

FIELD OF THE INVENTION

The present invention relates to an electrolyte membrane-electrode membrane assembly for a solid polymer fuel cell and a production method thereof, and a fuel cell equipped therewith.

More specifically, the present invention relates to an electrolyte membrane-electrode membrane assembly for solid polymer fuel cell, superior in output voltage, adhesiveness of the membranes, water resistance and durability, wherein anion-exchange resins forming gas diffusion electrode membrane and solid electrolyte membrane respectively are cross-linked between functional groups, and a production method thereof, and a fuel cell equipped therewith.

DESCRIPTION OF THE RELATED ART

A solid polymer fuel cell uses solid polymer such as ion-exchange resin as an electrolyte, and is characterized by relatively low operating temperature.

Figure 1:
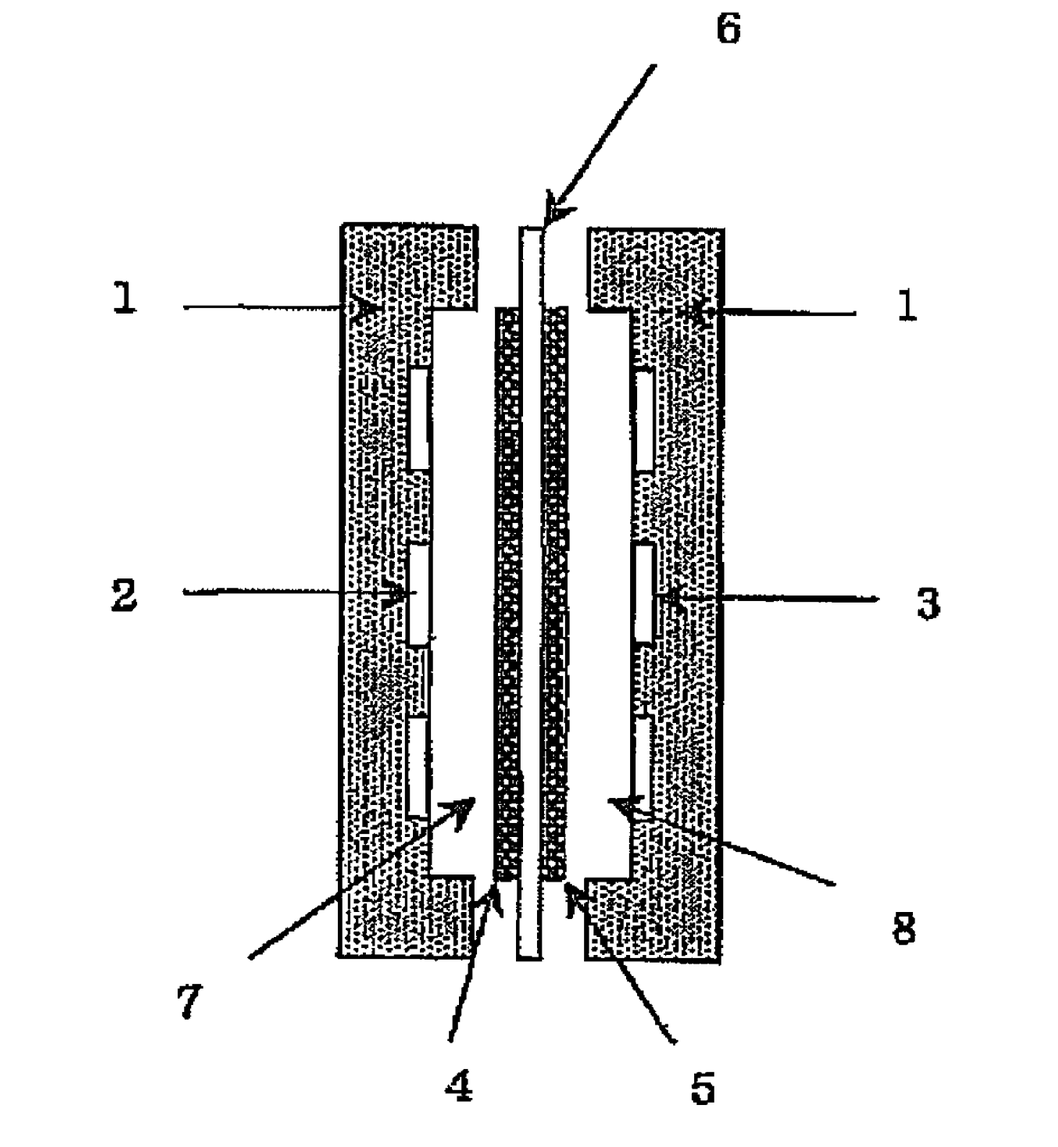
FIG. 1 shows an essential structure of a solid polymer fuel cell wherein an electrolyte membrane-electrode membrane assembly of the present invention can be used.

The solid polymer fuel cell has, as shown in FIG. 1, a basic structure wherein a space surrounded by cell interstructure 1 having fuel gas flow hole 2 and oxidizing gas flow hole 3, respectively communicated with outside, is divided by an electrolyte membrane-electrode membrane assembly in which a fuel chamber side gas diffusion electrode 4 and an oxidizing agent chamber side gas diffusion electrode 5 are bonded to both surfaces of a solid polymer electrolyte membrane 6 respectively, to form fuel chamber 7 communicated with outside via fuel gas flow hole 2 and an oxidizing agent chamber 8 communicated with outside via oxidizing gas flow hole 3.

In the solid polymer fuel cell having above basic structure, a fuel such as a hydrogen gas or methanol, etc. is supplied into said fuel chamber 7 via the fuel flow hole 2, and oxygen or oxygen containing gas such as air to act as an oxidizing agent is also supplied into the oxidizing agent chamber 8 via the oxidizing gas flow hole 3. An external load circuit is connected between both gas diffusion electrodes to generate electric energy by the following mechanism.

Namely, in the fuel chamber side gas diffusion electrode 4, a proton (hydrogen ion) generated by contacting a fuel with a catalyst included in the electrode conducts in the solid polymer electrolyte membrane 6 and moves into the oxidizing agent chamber 8 to generate water by reacting with oxygen in the oxidizing agent gas at the oxidizing agent chamber side gas diffusion electrode 5.

On the other hand, in the fuel chamber side gas diffusion electrode 4, an electron generated simultaneously with the proton moves to the oxidizing agent chamber side gas diffusion electrode 5 through the external load circuit, so that it is possible to use the above reaction energy as an electric energy.

In the solid polymer fuel cell having the above structure, a perfluorocarbon sulfonic acid resin membrane which is a cation-exchange resin membrane is most generally used as an electrolyte membrane.

Further, when the perfluorocarbon sulfonic acid resin membrane is used as an electrolyte membrane as a gas diffusion electrode, an electrode, wherein an electrode catalyst consisting of metal particles such as platinum optionally carried on a conductive agent such as carbon black is supported by an electrode substrate consisting of porous material, is generally used. Normally, the gas diffusion electrode is bonded to the perfluorocarbon sulfonic acid resin membrane by thermocompression.

Also, when bonding in such a way, in order to increase availability of protons generated on the catalyst in the gas diffusion electrode (i.e., in order to allow the protons to move effectively into the oxidizing agent chamber), an organic solution of perfluorocarbon sulfonic acid resin as an ion-conductivity providing agent is coated onto the bonding surface of the gas diffusion electrode, or perfluorocarbon sulfonic acid resin is mixed in the electrode (Patent Articles 1 and 2).

Note that the above perfluorocarbon sulfonic acid resin also has a function to improve the bonding property between solid polymer electrolyte membrane and gas diffusion electrode.

However, in a solid polymer fuel cell using such a perfluorocarbon sulfonic acid resin membrane, as problems mainly caused by the perfluorocarbon sulfonic acid resin membrane, the following problems are noted.

(i) it requires to replenish water due to insufficient water retaining capacity;

(ii) it is difficult to reduce electric resistance by decreasing a thickness of membrane due to low physical strength;

(iii) it is expensive; and (iv) when using methanol as a fuel, methanol is highly permeable, and methanol arriving at an oxidizing agent side gas diffusion electrode reacts with oxygen or air on the surface of the electrode, causing increase in overvoltage and reduction of output voltage.

Therefore, to solve the above-mentioned problems, especially the above problem (iv), it has been examined to use hydrocarbon-based anion-exchange membrane instead of perfluorocarbon sulfonic acid resin membrane, and several of such solid polymer fuel cells have been already proposed (Patent Articles 3 to 5).

Although the mechanism of electric power generation in a solid polymer fuel cell using the hydrocarbon-based anion-exchange membrane is basically similar with that of the fuel cell using cation-exchange membrane, when applying current, anions such as hydroxide ions migrate from the oxidizing agent chamber side to the fuel chamber side, causing methanol to hardly move, so that it is considered to allow solving the above problem (iv).

Due to using the hydrocarbon-based anion-exchange membrane, the above problems (i) to (iii) can be solved as well.

Note that in the gas diffusion electrode of the solid polymer fuel cell proposed in the above publications, an anion-exchange resin is added as an ion-conductivity providing agent for the same reason to add the perfluorocarbon sulfonic acid resin to the gas diffusion electrode when using the perfluorocarbon sulfonic acid resin membrane.

As the anion-exchange resin, there is used an anion exchange resin obtained by aminating a chloromethylated compound of a copolymer of aromatic polyether sulfonic acid and aromatic polythioether sulfonic acid (Patent Articles 3 and 4), or a quaternized polymer obtained by treating terminals of a perfluorocarbon polymer having a sulfonic acid group with diamine or a polymer such as quaternized polychloromethylstyrene, preferably those soluble in a solvent (Patent Article 5).

However, the present inventors studied a solid polymer fuel cell using hydrocarbon-based anion-exchange membrane as a solid electrolyte membrane, and found that the performance of the solid polymer fuel cell largely depends on properties of the ion-conductivity providing agent in the gas diffusion electrode, and that some of the properties prevent from obtaining the solid polymer fuel cell with sufficient performance.

Namely, it was found that when using a fluorine resin based anion exchange resin as an ion-conductivity providing agent, in a bonded interface between the hydrocarbon-based anion-exchange membrane of the solid electrolyte membrane and gas diffusion electrode, fitting of these two may be deteriorated, and the bonding strength may be declined even when adding a binding agent. It was also found that when using a hydrocarbon-based anion exchange resin as an ion-conductivity providing agent, many of the anion exchange resins are non-crosslinked to improve dispersibility and to obtain better contact with an electrode catalyst, and such a membrane becomes water-soluble when trying to increase catalyst activity by increasing ion-exchange capacity, causing to decline the performance when using for a long time in some cases.

Consequently, to solve these problems, the present inventors have been dedicated to develop a production method of a gas diffusion electrode for a solid polymer fuel cell, excellent in initial performance and hard reduce its performance even after longtime use, in a solid polymer fuel cell using a hydrocarbon-based anion-exchange membrane as a solid electrolyte membrane, and already proposed a successfully developed technique as a result of the keen examinations (Patent Article 6).

A production method of a gas diffusion electrode disclosed in Patent Article 6 is characterized by obtaining a formed article made from a composition comprising an electrode catalyst and two or more of organic compounds which can cross link by contacting each other to form an ion-exchange resin, and crosslinking said two or more of organic compounds included in the formed article.

Note that in a gas diffusion electrode produced by the method disclosed in Patent Article 6, as described above, the organic compounds capable of crosslinking to form an ion-exchange resin are used, and that the formed crosslinked ion-exchange resin acts as an ion conductor of a proton and a hydroxide ion to increase an effective availability of the catalyst in the gas diffusion electrode (hereinafter referred to as a "gas diffusion electrode membrane").

Also, in this case, unlike a case using preliminarily crosslinked ion-exchange resin, since the above non-crosslinked organic compounds are well blended and uniformly mixed with the electrode catalyst, not only paste quality is favorable, but also a contact between the ion-exchange resin formed after crosslinking reaction and the electrode catalyst is remarkably good.

As described above, the proposal according to Patent Article 6 allows to form a gas diffusion electrode membrane good in catalyst dispersibility and ion conductivity, and to obtain high electrode activity. Also, when using organic compounds capable of providing a hydrocarbon-based anion-exchange resin, the resin acts as a binding agent in bonding to a hydrocarbon-based anion-exchange membrane of a solid electrolyte membrane.

Therefore, it is possible to well bond the hydrocarbon resin based solid electrolyte membrane and the gas diffusion electrode membrane to obtain high electrode activity, and since the formed ion-exchange resin has a cross-linked structure, it is hardly-soluble in water and methanol.

As a result, in a fuel cell using the gas diffusion electrode membrane, even when using methanol as a fuel, the anion-exchange resin of the electrode is not eluted in by-product water and the like; improves thermal resistance and chemical resistance; and enables to increase durability of the battery itself.

Patent Article 1: The Japanese Unexamined Patent Publication J-103-208260;
Patent Article 2: The Japanese Unexamined Patent Publication and H04-329264;
Patent Article 3: The Japanese Unexamined Patent Publication H11-273695;
Patent Article 4: The Japanese Unexamined Patent Publication and H11-135137;
Patent Article 5: The Japanese Unexamined Patent Publication 2000-331693; and
Patent Article 6: The Japanese Unexamined Patent Publication 2003-86193.

DISCLOSURE OF INVENTION

Problem to be Solved by the Invention

Although the gas diffusion electrode membrane produced in the production method described in Patent Article 6 has, as mentioned above, a variety of excellent properties, the formation of the crosslinked ion-exchange resin is limited only within the range of the gas diffusion electrode membrane.

Therefore, a bonding between a gas diffusion electrode membrane and a solid electrolyte membrane produced in said production method, even in a preferred embodiment, is performed by using a binding agent of a variety of thermoplastic resins as described above, and it is simply an adhesive joining, i.e. limited within a range of physical binding, so that there is no chemical binding between the two membranes.

As a result, said excellent properties of the gas diffusion electrode membrane obtained by the production method according to Patent Article 6 are also limited within the range of physical binding as mentioned above.

Consequently, the present inventors have been dedicated to develop an electrolyte membrane-electrode membrane assembly for a solid polymer fuel cell, having the properties of the above described gas diffusion electrode membrane, enabling to well bond a gas diffusion electrode membrane and a solid electrolyte membrane and to uniformly diffuse electrode catalysts to obtain high electrode activity, and having superior properties. It is the present invention to be successfully developed as a result of the keen examinations.

Therefore, a problem to be solved by the present invention is to develop the electrolyte membrane-electrode membrane assembly, having the above-mentioned properties of the gas diffusion electrode membrane, and being superior in bonding property of the gas diffusion electrode membrane and solid electrolyte membrane and higher in electrode activity. Specifically, since said bonding mechanism differs qualitatively from the conventional one by a binding agent, a problem to be solved, i.e. the purpose is to provide an electrolyte membrane-electrode membrane assembly for a solid polymer fuel cell, superior in bonding property, water resistance, durability and output voltage.

Means for Solving the Problem

The present invention provides a means for solving said problem, i.e. an electrolyte membrane-electrode membrane assembly for a solid polymer fuel cell, a production method thereof and a fuel cell equipped therewith. Specifically, the gist of the present invention will be described as below.

(1) An electrolyte membrane-electrode membrane assembly for a solid polymer fuel cell, wherein
a gas diffusion electrode membrane formed with a quaternary base anion-exchange resin and an electrode catalyst is bonded to a solid electrolyte membrane formed with a quaternary base anion-exchange resin;

at least a part of the quaternary base anion-exchange groups of the anion-exchange resin included in the gas diffusion electrode membrane and solid electrolyte membrane around the bonded interface is bonded to each other via the quaternary base forming functional group of each ion-exchange resin and the functional groups of a polyfunctional quaternarizing agent; and the anion-exchange resins included in the gas diffusion electrode membrane and solid electrolyte membrane are crosslinked via the polyfunctional quaternarizing agent.

(2) The electrolyte membrane-electrode membrane assembly for a solid polymer fuel cell as set forth in (1), wherein the polyfunctional quaternarizing agent is a bifunctional quaternarizing agent.

(3) The electrolyte membrane-electrode membrane assembly for a solid polymer fuel cell as set forth in (1), wherein the anion-exchange groups in the anion-exchange resins included in the gas diffusion electrode membrane and solid electrolyte membrane are quaternary ammonium bases, and the polyfunctional quaternarizing agent is an alkyl diamine.

(4) The electrolyte membrane-electrode membrane assembly for a solid polymer fuel cell as set forth in (1), wherein the anion-exchange groups in the anion-exchange resins included in the gas diffusion electrode membrane and solid electrolyte membrane are pyridinium bases, and the polyfunctional quaternarizing agent is a dihaloalkane.

(5) A production method of a gas diffusion electrolyte membrane-electrode membrane assembly for a solid polymer fuel cell comprising steps of jointing a molded membrane for forming a gas diffusion electrode membrane formed by a paste composition including a polymeric organic compound having a quaternary base forming functional group and an electrode catalyst with a quaternary base anion-exchange resin precursor membrane for forming a solid electrolyte membrane having a quaternary base forming functional group;

forming of a quaternary base anion-exchange group by bonding a polyfunctional quaternarizing agent to a quaternary base forming functional group included in each of said molded membrane and said precursor membrane via each functional group of the polyfunctional quaternarizing agent which is present around the bonded interface of both membranes to thereby crosslink the formed anion-exchange resins in both membranes via the polyfunctional quaternarizing agent simultaneously; and subjecting the non-quaternarized residue of the quaternary base forming functional groups in thus-obtained assembly to a quaternary base forming treatment.

(6) The production method of the gas diffusion electrolyte membrane-electrode membrane assembly for a solid polymer fuel cell as set forth in (5), wherein the paste composition contains the polyfunctional quaternarizing agent; and the polyfunctional quaternarizing agent is present in the bonded interface of the molded membrane for forming a gas diffusion electrode membrane and the anion-exchange resin precursor membrane.

(7) The production method as set forth in (5) or (6), wherein the quaternary base forming functional group is a halogen atom containing organic group; and the functional group of the polyfunctional quaternarizing agent is an organic group including an atom having a lone pair of electrons.

(8) The production method as set forth in (5) or (6), wherein the quaternary base forming functional group is an organic group including an atom having a lone pair of electrons; and the functional group of the polyfunctional quaternarizing agent is a halogen atom containing organic group.

(9) A production method of a hydroxide ion-based electrolyte membrane-electrode membrane assembly for a solid polymer fuel cell, wherein in a gas electrolyte membrane-electrode membrane assembly for a solid polymer fuel cell obtained by the production method as set forth in any one of (5) to (8), a counter anion of the quaternary base anion-exchange group of the anion-exchange resins forming the gas diffusion electrode membrane and the solid electrolyte membrane, is substituted with a hydroxide ion.

(10) The production method as set for the in any one of (5) to (9), wherein the polyfunctional quaternarizing agent is a bifunctional quaternarizing agent.

(11) A solid polymer fuel cell comprising the electrolyte membrane-electrode membrane assembly for a solid polymer fuel cell as set for the in any one of the above (1) to (4).

As described above, in a production method of the present invention, by bonding the functional group for forming an ion-exchange group of a polymeric organic compound for forming a gas diffusion electrode membrane or a solid electrolyte membrane and the functional group of a polyfunctional quaternarizing agent, an ion-exchange group and a cross-linked structure are formed.

Therefore, either of the above compound or agent may be a compound having a halogen atom in its terminal, and the other may be a compound including an atom having a lone pair of electrons as a corresponding organic group. Both of them may form an onium salt in both of the atoms to form an anion-exchange group as well as a cross-linked structure between both anion-exchange groups.

Note that as the anion-exchange resin precursor for forming a solid electrolyte membrane, it is favorable in uniformity of the obtained solid electrolyte membrane to use a polymerizable organic compound having a functional group which forms an anion-exchange group when forming the membrane, but it is also possible to use a polymeric organic compound having a functional group which forms an anion-exchange group.

Also, as is clear from the above description, since the organic compound for forming an ion-exchange resin and the polyfunctional quaternarizing agent are bonded each other to form the ion-exchange group, both need to have a mutually different atom. Therefore, when the organic compound for forming an ion-exchange resin has a halogen atom in its terminal, the polyfunctional quaternarizing agent needs to be a compound including an atom having a lone pair of electrons as a corresponding functional group; in contrast, when said organic compound is a compound including an atom having a lone pair of electrons, the polyfunctional quaternarizing agent needs to include a halogen atom as a corresponding functional group.

Effects of the Invention

In the present invention, an anion-exchange resin included in a gas diffusion electrode membrane and an anion-exchange resin forming a solid electrolyte membrane are crosslinked via a polyfunctional quaternarizing agent (e.g. a compound having a halogen atom in two terminals such as dihalogenoalkane, or a compound including an atom having alone pair of electrons in two terminals such as alkyl diamine). Also, at least part of both ion-exchange groups present in a bonded interface of the gas diffusion electrode membrane and the solid electrolyte membrane is formed by using the quaternarizing agent.

Therefore, an assembly of the gas diffusion electrode membrane and the solid electrolyte membrane in the present invention is qualitatively different from that of a solid electrolyte membrane and a gas diffusion electrode membrane disclosed in Patent Article 6, and is stronger due to chemical bonding and superior in bonding property.

In addition, when using a hydrocarbon-based anion-exchange resin as an anion-exchange resin for forming a solid electrolyte membrane, at bonding to the hydrocarbon-based anion-exchange membrane of the solid electrolyte membrane, it is possible to well bond the hydrocarbon resin-based solid electrolyte membrane and the gas diffusion electrode membrane to obtain high electrode activity. Also, since both of the formed ion-exchange resins form a cross-linked structure therebetween via the polyfunctional quaternarizing agent, they are superior in durability against water and methanol.

As a result, in a fuel cell using an electrolyte membrane-electrode membrane assembly of the present invention, even when using methanol as a fuel, the solid electrolyte membrane and the gas diffusion electrode membrane are not peeled; the thermal resistance and chemical resistance are further improved, enabling to further increase durability of the battery itself; and water resistance and durability are remarkably superior.

DESCRIPTION OF SYMBOLS 1 cell interstructure
2 fuel gas flow hole
3 oxidizing gas flow hole
4 fuel chamber side gas diffusion electrode (membrane)
5 oxidizing agent chamber side gas diffusion electrode (membrane)
6 solid polymer electrolyte membrane
7 fuel chamber
8 oxidizing agent chamber

BEST MODE FOR WORKING THE INVENTION

Hereinafter, a variety of embodiments including the best mode for working the present invention will be described in detail, but the present invention is not limited to the embodiments.

The present invention provides, as described above, an electrolyte membrane-electrode membrane assembly for a solid polymer fuel cell, a production method thereof and a fuel cell equipped therewith. The electrolyte membrane-electrode membrane assembly for a solid polymer fuel cell is characterized in that a gas diffusion electrode membrane formed with a quaternary base anion-exchange resin and an electrode catalyst, and a solid electrolyte membrane formed with a quaternary base anion-exchange resin are bonded; at least a part of the quaternary base anion-exchange groups of the anion-exchange resin which forms both membranes around the bonded interface is bonded to each other via a quaternary base forming functional group of each ion-exchange resin and functional groups of a polyfunctional quaternarizing agent; and via the polyfunctional quaternarizing agent, both anion-exchange resins are crosslinked.

In the present invention, the anion-exchange resin which forms the gas diffusion electrode membrane and the solid electrolyte membrane is not particularly limited and may be any as far as it can form an ion-exchange group with a polyfunctional quaternarizing agent and a cross-linked structure via the quaternarizing agent.

Note that an organic compound, which is a primary material for forming a membrane of the anion-exchange resin, may be either of a polymeric organic compound (polymer) including a functional group which can form an anion-exchange group, or a polymerizable organic compound (monomer) including a functional group which can form an anion-exchange group and having unsaturated hydrocarbon chain.

For the anion-exchange group in said ion-exchange resin, a quaternary base is used because of its strong ion conductivity, and specifically, known quaternary base anion-exchange group such as a quaternary ammonium base and pyridinium base is used.

Note that as a gas diffusion electrode membrane used to bond to a hydrocarbon-based anion-exchange membrane which is solid electrolyte membrane, it is preferred to use a hydrocarbon-based anion-exchange resin, and a hydrocarbon-based anion-exchange resin having a strongly-basic quaternary ammonium base or a pyridinium base, capable to provide good ion conductivity, are especially preferably used.

In this context, "hydrocarbon-based" means that 50% or more, preferably 80% or more, of atoms bonded to a carbon atom in an organic compound molecule, are hydrogen atoms.

Also, a content of the ion-exchange group in the ion-exchange resin of the obtained assembly is not particularly limited, but in a gas diffusion electrode membrane portion, from a viewpoint to provide good ion conductivity, ion-exchange capacity of the ion-exchange resin is preferably 0.1 to 5.0 mmol/g, more preferably 0.5 to 4.0 mmol/g.

Further, in an ion exchange membrane portion, as described above, a content of the ion-exchange group is not particularly limited, but from a viewpoint to reduce electric resistance value of the anion-exchange membrane and to have good electric efficiency at generating electricity, anion-exchange capacity of the electrolyte membrane is preferably 0.2 to 5.0 mmol/g, particularly preferably 0.5 to 3.0 mmol/g.

In addition to these, for obtaining a good contact of the formed ion-exchange resin with the electrode catalyst, said polymeric organic compound is preferably well immingled with the electrode catalyst and uniformly dispersed.

The organic compound, which is a primary material for forming the ion-exchange resin, undergoes a crosslinking reaction by simply mixing or contacting with the polyfunctional quaternarizing agent, but heating treatment after obtaining a molded membrane can result in increasing a reaction rate, which is preferable.

As a polymeric compound for forming an anion-exchange resin which forms a gas diffusion electrode membrane of the assembly of the present invention, there are mentioned a halogen atom containing polymeric organic compound and a polymeric organic compound having a lone pair of electrons.

The latter polymeric organic compound having a lone pair of electrons is not particularly limited and may be any as far as the compound has at least one organic residue bonded to at least one atom having a lone pair of electrons such as nitrogen, sulfur, oxygen, phosphorus, selenium, tin, iodine and antimony existing in a molecule to coordinate a cationic atom or atomic group to the atom and to thereby form a cation (onium ion).

Note that the above atom having a lone pair of electrons may be, from a viewpoint that the formed ion-exchange resin is useful, nitrogen, phosphorus or sulfur, and is particularly preferably nitrogen. Also, from a viewpoint to allow obtaining high crosslink density, it is preferred to use a polymeric organic compound containing a plurality of the above mentioned atoms having a lone pair of electrons in a molecule.

To take an example of these polymeric compounds, the former may include polychloromethylstyrene, polybromoethylstyrene, polyvinyl chloride, polyepichlorohydrin, polybromohydrin, chloromethylated polysulphone, chloromethylated polyphenyleneoxide, chloromethylated polyether ether ketone, etc.

Also, the latter may include an N-containing compound such as polyvinylpyridine, polyvinylimidazole, polybenzimidazole, polyvinyloxazoline, polyvinylbenzyldimethylamine and polydimethylallylamine; a P-containing compound such as polystyryldiphenylphosphine; and an S-containing compound such as polymethylthiostyrene and polyphenylthiostyrene.

Note that in the present invention, the organic compound for forming an ion-exchange resin and the polyfunctional quaternarizing agent are bonded each other to form the ion-exchange group, so that both need to have a mutually different atom respectively. Therefore, when the organic compound for forming an ion-exchange resin has a halogen atom in its terminal, the polyfunctional quaternarizing agent has to be a compound containing an atom having a lone pair of electrons in a molecule as a corresponding functional group; in contrast, when said organic compound is a compound containing an atom having a lone pair of electrons in a molecule, the polyfunctional quaternarizing agent has to contain a halogen atom in an end as a corresponding functional group.

Then, as for a polymeric compound to form the anion-exchange resin for forming the solid electrolyte membrane of the assembly of the present invention, as with the gas diffusion electrode membrane, there are mentioned a halogen atom containing polymeric organic compound and a polymeric organic compound containing a lone pair of electron. In the case of the solid electrolyte membrane, it is preferable in water resistance, durability or fuel impermeability, etc., that the anion-exchange resin has a cross-linked structure formed by a polymerizable organic compound for forming a cross-linked structure such as divinylbenzene.

Note that when the anion-exchange resin which forms the solid electrolyte membrane has the above described cross-linked structure, it is hard to be dissolved in a solvent. Therefore, a polymerizable organic compound, i.e. a monomer, may be used as a primary organic compound material for forming a membrane and copolymerized after forming the membrane to form the cross-linked structure.

As described above, the polyfunctional quaternarizing agent has two types, one for a halogen atom containing organic compound and the other for an organic compound containing a lone pair of electrons. A variety of agents can be used as far as it shows aforementioned functions to said organic compound, without particular limitation.

In this case, as the former polyfunctional quaternarizing agent for a halogen atom containing organic compound, there may be mentioned a nitrogen containing compound having 2 or more amino groups, a phosphorus containing compound having 2 or more phosphino groups such as bis(dimethylphosphino) propane and bis(diphenylphosphino)propane, and a sulfur containing compound having two or more thio groups, etc., such as bis(methylthio) methane and bis(phenylthio)methane; and preferably, diamine, triamine or tetraamine, particularly preferably diamine, is used.

Such a polyamine compound is expressed by, for example, the following formula (1).

[Chemical Formula (1)]

In the above formula, "R" is a tetravalent hydrocarbon backbone, with carbon number of preferably 1 to 15, particularly preferably 2 to 8, and may be either linear or branching. $X^1$, $X^2$, $X^3$ and $X^4$ are independently an amino group expressed by $-NR^1R^2$ ($R^1$ and $R^2$ are alkyl groups), hydrogen and an alkyl group with carbon number of 1 to 4, and at least two of $X^1$, $X^2$, $X^3$ and $X^4$ are amino groups.

In the above description, $R^1$ and $R^2$ constituting the amino group ($-NR^1R^2$) are independently an alkyl group with carbon number 1 to 4. Preferably, methyl group, ethyl group, n-propyl group, i-propyl group, n-butyl group and i-butyl group may be mentioned, and more preferably, methyl group and ethyl may be mentioned.

Therefore, as a particularly preferable polyfunctional quaternarizing agent, N,N,N',N'-tetraalkylalkylene diamine compound, expressed by the following formula (2), can be mentioned.

Note that in the formula (2), substituents $R^1$ to $R^4$ independently mean an alkyl group with carbon number 1 to 4. Specifically, there may be mentioned methyl group, ethyl group, n-propyl group, i-propyl group, n-butyl group and i-butyl group, and more preferably methyl group and ethyl are mentioned.

Also, "n" means an integer of 1 to 15, and more preferably "n" means an integer of 2 to B.

[Chemical Formula (2)]

In the production method of the present invention, a compound expressed by said formula (1) is not particularly limited, and for example, as a compound expressed by said formula (2), N,N,N',N'-tetramethylethylenediamine, N,N,N',N'-tetramethyl-1,3-propanediamine, N,N,N',N'-tetramethyl-1,4-butanediamine, N,N,N',N'-tetramethyl-1,5-pentanediamine, N,N,N',N'-tetramethyl-1,6-hexanediamine, N,N,N',N'-tetramethyl-1,7-heptanediamine, N,N,N',N'-tetramethyl-1,8-octanediamine, N,N,N',N'-tetraethylethylenediamine, N,N,N',N'-tetraethyl-1,3-propanediamine, N,N,N',N'-tetraethyl-1,4-butanediamine, N,N,N',N'-tetraethyl-1,5-pentanediamine, N,N,N',N'-tetraethyl-1,6-hexanediamine, N,N,N',N'-tetraethyl-1,7-heptanediamine, N,N,N',N'-tetraethyl-1,8-octanediamine, etc., may be mentioned.

In addition to the above, as a compound other than those expressed by the above formula (2) among compounds expressed by said formula (1), for example, N,N,N',N',N'',N''-hexamethylmethanetriamine, N,N,N',N',N'',N'',N''',N'''-octamethylmethanetetraamine, N,N,N',N',N'',N''-hexamethyl-1,1,2-ethanetriamine, N,N,N',N',N'',N'',N''',N'''- octamethyl-1,1,2,2-ethanetetraamine, N,N,N',N',N'',N''-hexamethyl-1,1,3-propanetriamine, N,N,N',N',N'',N''',N'''-octamethyl-1,1,3,3-propanetetraamine, N,N,N',N',N'',N''-hexamethyl-1,1,4-butanetriamine, N,N,N',N',N'',N'',N'''-octamethyl-1,1,4,4-butanetetraamine, N,N,N',N',N'',N''-hexamethyl-1,1,5-pentanetriamine, N,N,N',N',N'',N'',N'''-octamethyl-1,1,5,5-pentanetetraamine, N,N,N',N',N'',N''-hexamethyl-1,1,6-hexanetriamine, N,N,N',N',N'',N'',N'''-octamethyl-1,1,6,6-hexanetetraamine, N,N,N',N',N''-hexamethyl-1,1,7-heptanetriamine, N,N,N',N',N'',N''',N'''-octamethyl-1,1,7,7-heptanetetraamine, N,N,N',N',N'',N''-hexamethyl-1,1,8-octanetriamine, N,N,N',N',N'',N''',N'''-octamethyl-1,1,8,8-octanetetraamine, N,N,N',N'-tetramethyl-1,2-propanediamine, N,N,N',N'-tetramethyl-1,3-butanediamine, N,N,N',N'-tetramethyl-1,4-pentanediamine, N,N,N',N'-tetramethyl-1,5-hexanediamine, N,N,N',N'-tetramethyl-1,6-heptanediamine, N,N,N',N'-tetramethyl-1,7-octanediamine, N,N,N',N'-tetraethyl-2,3-butanediamine, N,N,N',N'-tetraethyl-2,4-pentanediamine, N,N,N',N'-tetraethyl-2,5-hexanediamine, N,N,N',N'-tetraethyl-2,6-heptanediamine, N,N,N',N'-tetraethyl-2,7-octanediamine, N,N,N',N'-tetraethyl-2,3-pentanediamine, N,N,N',N'-tetraethyl-2,3-hexanediamine, N,N,N',N'-tetraethyl-2,3-heptanediamine, N,N,N',N'-tetraethyl-2,3-octanediamine, N,N,N',N'-tetraethyl-2,4-hexanediamine, N,N,N',N'-tetraethyl-2,4-heptanediamine, N,N,N',N'-tetraethyl-2,4-octanediamine, N,N,N',N'-tetraethyl-2,5-heptanediamine, N,N,N',N'-tetraethyl-2,4-octanediamine, 2,2'-bis(dimethylaminomethyl)propane, 1,1',1''-tris(dimethylaminomethyl)ethane, tetrakis(dimethylaminomethyl)methane, etc., can be mentioned.

Also, as the latter polyfunctional quaternarizing agent for an organic compound containing a lone pair of electrons, a compound having 2 or more halogeno groups, preferably dihalogeno compound, trihalogeno compound and tetrahalogeno compound, particularly preferably dihalogeno compound, can be used.

Such a polyhalogeno compound is expressed by, for example, the following formula (3).

[Chemical Formula (3)]

(3)

In the above formula, "R" is a tetravalent hydrocarbon backbone, with carbon number of preferably 1 to 15, particularly preferably 3 to 8, and may be either linear or branching. $X^1$, $X^2$, $X^3$ and $X^4$ are independently a halogeno group, hydrogen, and an alkyl group with carbon number of 1 to 4, and at least two of $X^1$, $X^2$, $X^3$ and $X^4$ are halogeno groups. As a halogeno group, specifically, chloro group, bromo group and iodine group may be mentioned.

Therefore, as a particularly preferable polyfunctional quaternarizing agent, dihalogenoalkane expressed by formula (4) can be mentioned.

Note that in formula (4), each of substituents $X^1$ to $X^2$ independently means a halogeno group, and specifically, chloro group, bromo group and iodine group may be mentioned. Also, "n" is an integer of 1 to 15, and more preferably, "n" is an integer of 3 to 8.

[Chemical Formula (4)]

$$X^1-(CH_2)_n-X^2 \quad (4)$$

In the production method of the present invention, a compound expressed by said formula (3) is not particularly limited, and for example, as a compound expressed by said formula (4), 1,2-dichloroethane, 1,3-dichloropropane, 1,4-dichlorobutane, 1,5-dichloropentane, 1,6-dichlorohexane, 1,7-dichloroheptane, 1,8-dichlorooctane, 1,2-dibromoethane, 1,3-dibromopropane, 1,4-dibromobutane, 1,5-dibromopentane, 1,6-dibromohexane, 1,7-dibromoheptane, 1,8-dibromooctane, 1,2-diiodoethane, 1,3-diiodopropane, 1,4-diiodobutane, 1,5-diiodopentane, 1,6-diiodohexane, 1,7-diiodoheptane, 1,8-diiodooctane, etc., may be mentioned.

In addition to the above, as a compound other than those expressed by the above formula (4) among compounds expressed by said formula (3), for example, 1,1,2-trichloroethane, 1,1,3-trichloropropane, 1,1,4-trichlorobutane, 1,1,5-trichloropentane, 1,1,6-trichlorohexane, 1,1,7-trichloroheptane, 1,1,8-trichlorooctane, 1,1,2-tribromoethane, 1,1,3-tribromopropane, 1,1,4-tribromobutane, 1,1,5-tribromopentane, 1,1,6-tribromohexane, 1,1,7-tribromoheptane, 1,1,8-tribromooctane, 1,1,2-triiodoethane, 1,1,3-triiodopropane, 1,1,4-triiodobutane, 1,1,5-triiodopentane, 1,1,6-triiodohexane, 1,1,7-triiodoheptane, 1,1,8-triiodooctane, 1,1,2,2-tetrachloroethane, 1,1,3,3-tetrachloropropane, 1,1,4,4-tetrachlorobutane, 1,1,5,5-tetrachloropentane, 1,1,6,6-tetrachlorohexane, 1,1,7,7-tetrachloroheptane, 1,1,8,8-tetrachlorooctane, 1,1,2,2-tetrabromoethane, 1,1,3,3-tetrabromopropane, 1,1,4,4-tetrabromobutane, 1,1,5,5-tetrabromopentane, 1,1,6,6-tetrabromohexane, 1,1,7,7-tetrabromoheptane, 1,1,8,8-tetrabromooctane, 1,1,2,2-tetraiodoethane, 1,1,3,3-tetraiodopropane, 1,1,4,4-tetraiodobutane, 1,1,5,5-tetraiodopentane, 1,1,6,6-tetraiodohexane, 1,1,7,7-tetraiodoheptane, 1,1,8,8-tetraiodooctane, 2,2'-dimethyl-1,3-dichloropropane, 2-methyl-2-chloromethyl-1,3-dichloropropane, 2,2'-dichloromethyl-1,3-dichloropropane, 2,2'-dimethyl-1,3-dibromopropane, 2-methyl-2-bromomethyl-1,3-dibromopropane, 2,2'-dibromomethyl-1,3-dibromopropane, 2,2'-dimethyl-1,3-diiodopropane, 2-methyl-2-iodomethyl-1,3-diiodopropane, 2,2'-diiodomethyl-1,3-diiodopropane, etc., can be mentioned.

Also, as an electrode catalyst which forms the gas diffusion electrode membrane together with the anion-exchange resin, a metallic particle which promotes oxidation reaction of hydrogen and reduction reaction of oxygen, used as an electrode catalyst in the conventional gas diffusion electrode, can be used without any limitation. As the metal, platinum, gold, silver, palladium, iridium, rhodium, ruthenium, tin, iron, cobalt, nickel, molybdenum, tungsten, vanadium, or an alloy thereof, etc., can be exemplified, and among these, because of its excellent catalyst activity, platinum catalyst is preferably used.

Note that a particle size of the metallic particle to be the catalyst is normally 0.1 to 100 nm, more preferably 0.5 to 10 nm.

When using it, the smaller particle size results in higher catalyst performance, but it is difficult to produce those having a particle size of less than 0.5 nm and it is also difficult to obtain sufficient catalyst performance with those having a particle size of more than 100 nm.

Note that these catalysts may be preliminarily supported with a conductive carrier to make a conductive agent. As the conductive carrier, although not particularly limited as far as it is an electronically conductive agent, for example, carbon black such as furnace black and acetylene black, activated carbon, black lead, etc., may be commonly used either independently or by mixture.

A content of these catalysts in the conductive agent is 5 to 80 mass %, preferably 30 to 60 mass %.

Next, a production method of a gas diffusion electrolyte membrane-electrode membrane assembly for a solid polymer fuel cell of the present invention will be described.

The production method of an electrolyte membrane-electrode membrane assembly of the present invention is, as described above, characterized in jointing a molded membrane for forming a gas diffusion electrode membrane formed by a paste composition including a polymeric organic compound having a quaternary base forming functional group and an electrode catalyst, with a quaternary base anion-exchange resin precursor membrane for forming a solid electrolyte membrane having a quaternary base forming functional group; forming of a quaternary base anion-exchange group by bonding a polyfunctional quaternarizing agent to the quaternary base forming functional group included in each of said molded membrane and said precursor membrane via each functional group of the polyfunctional quaternarizing agent which is present around the bonded interface of both membranes to thereby crosslink the formed anion-exchange resins in both membranes via the polyfunctional quaternarizing agent simultaneously; and subjecting the non-quaternarized residue of the quaternary base forming functional groups in thus-obtained assembly to a quaternary base forming treatment.

The production method of the present invention is as described above, and not further particularly limited, but the assembly of the present invention has, as clearly shown in FIG. 1, etc., a structure wherein a solid electrolyte membrane 6 (hereinafter may be simply referred to as an electrolyte membrane) supports (holds) gas diffusion electrode membranes 4 and 5 (hereinafter may be simply referred to as an electrode membrane) in both sides.

Therefore, the production process includes: first forming a quaternary base anion-exchange resin precursor membrane for forming an electrolyte membrane on a porous membrane which is a substrate (support); and on the formed precursor membrane, applying a paste composition including a an organic compound primary material, an electrode catalyst and a polyfunctional quaternarizing agent for forming a gas diffusion electrode membrane to form a molded membrane for forming a gas diffusion electrode membrane. Aforementioned process is preferable in convenience in the production process such as membrane forming process or in conductivity, etc., to produce an assembly of the present invention.

On the surface of thus formed molded membrane for forming an electrode membrane, there exists the polyfunctional quaternarizing agent included in the paste composition as a primary material. Each functional group of the polyfunctional quaternarizing agent present on the surface can readily initiate a quaternary base forming reaction not only with a quaternary base forming functional group present on the surface of the molded membrane for forming an electrode membrane, but also with a quaternary base forming functional group present on the surface of the quaternary base anion-exchange resin precursor membrane.

Also, since a part of the polyfunctional quaternarizing agent included in the molded membrane for forming an electrode membrane permeates the precursor membrane side when the molded membrane for forming an electrode membrane is jointed to quaternary base anion-exchange resin precursor membrane, on the surface of the quaternary base anion-exchange resin precursor membrane, there exists the polyfunctional quaternarizing agent which can readily initiate a quaternary base forming reaction not only with the quaternary base forming functional group present in the precursor membrane, but also with the quaternary base forming functional group present on the surface of the molded membrane for forming an electrode membrane.

By action of the polyfunctional quaternarizing agent present in the bonded interface of the molded membrane for forming an electrode membrane and the quaternary base anion-exchange resin precursor membrane, a cross-linked structure is formed between both membranes in an assembly of the present invention.

The polyfunctional quaternarizing agent is preferred to be used in the embodiment as described above, but is not limited to it and may be included in a solution of the organic compound primary material for forming an electrolyte membrane, or separately applied on a membrane of the organic compound primary material for forming an electrolyte membrane followed by forming a membrane of the paste composition for forming an electrode membrane.

Note that it is obviously unnecessary for the polyfunctional quaternarizing agent to be included in the paste composition when separately applying it, but it is not affected if the agent is included.

In the present invention, the ion-exchange resin is present both in the solid electrolyte membrane and the gas diffusion electrode membrane. In the solid electrolyte membrane, as the organic compound which is the primary material for forming the membranes, a variety of compounds can be used without particular limitation as far as it can form an ion-exchange group by the polyfunctional quaternarizing agent, and form a cross-linked structure through the formed group.

Therefore, a polymeric organic compound (polymer) having an anion-exchange group formable of functional group may be used as the primary material, or a polymerizable organic compound (monomer) having an anion-exchange group formable functional group and an unsaturated hydrocarbon chain may be used as the material.

On the other hand, as for the gas diffusion electrode membrane, in the present invention, it is preferable in convenience for forming a membrane or in dispersibility of the conductive agent, etc., that the organic compound, which is the primary material for forming the membrane, is a polymeric organic compound.

Note that the anion-exchange group formable functional group here obviously includes a quaternary base forming functional group, and also includes a functional group wherein the quaternary base forming functional group can be introduced.

Namely, the anion-exchange group formable functional group obviously includes a functional group which can readily form the quaternary base anion-exchange group by bonding to the polyfunctional quaternarizing agent as well as the one wherein the quaternary base forming functional group is first formed followed by forming the quaternary base anion-exchange group by bonding to the polyfunctional quaternarizing agent.

However, the monomer is preferred as the primary material in the electrolyte membrane. This is because the resin is normally made have a cross-linked structure by divinylbenzene, etc., since the electrolyte membrane requires performances such as water resistance, durability or anti-fuel permeability, and the crosslinked resin is hardly dissolved in a solvent and therefore is hardly made a paste as required when forming the membrane.

In contrast, the electrode membrane is formed by using the paste composition wherein the electrode catalysts are uniformly dispersed, so that the polymer is preferred in ease of the production process or in dispersibility of the conductive agent, etc., to be used as the primary material.

At least a part of ion-exchange groups of both of the membranes in the bonded interface of the gas diffusion electrode membrane and the solid electrolyte membrane is formed by the polyfunctional quaternarizing agent. Since the polyfunctional quaternarizing agent is, as described above, preferably alkyl diamine or dihaloalkane, the organic compound primary material forming the ion-exchange resin may be the one which reacts with these polyfunctional quaternarizing agents to form the ion-exchange groups.

The above includes a halogen atom containing organic compound and an organic compound containing a lone pair of electrons. The former, the halogen atom containing organic compound, reacts with alkyl diamine to form the ion-exchange group; and the latter, the organic compound containing a lone pair of electrons reacts with dihaloalkane to form the ion-exchange group. At the same time, between both of the resins existing in the bonded interface of the above gas diffusion electrode membrane and solid electrolyte membrane, a cross-linked structure is formed via the polyfunctional quaternarizing agent.

Also, the polymeric organic compound of the former halogen atom containing organic compound includes polychloromethylstyrene, polybromoethylstyrene, polyvinyl chloride, polyepichlorohydrin, polybromohydrin, chloromethylated polysulfone, chloromethylated polyphenyleneoxide, chloromethylated polyether ether ketone, etc.

Further, the polymerizable organic compound includes chloromethylstyrene, bromomethylstyrene, etc.

Also, as the latter organic compound containing a lone pair of electrons, as far as the compound has at least one organic residue bonded to at least one atom having a lone pair of electrons such as nitrogen, sulfur, oxygen, phosphorus, selenium, tin, iodine, and antimony existing in a molecule to coordinate a cationic atom or atomic group to the atom and to thereby form a cation (onium ion), a variety of known compounds can be used without particular limitation.

Note that the above atom having a lone pair of electrons may be, from a viewpoint of usability of the formed ion-exchange resin, nitrogen, phosphorus or sulfur, and is particularly preferably nitrogen. Also, from a viewpoint to allow obtaining high crosslink density, it is preferred to use an organic compound containing a plurality of the above mentioned atoms having a lone pair of electrons in a molecule.

To take some specific examples as organic compound containing a lone pair of electrons, the polymeric organic compound includes an N-containing compound such as polyvinylpyridine, polyvinylimidazole, polybenzimidazole, polyvinyloxazoline, polyvinylbenzyldimethylamine and polydimethylallylamine, a P-containing compound such as polystyryldiphenylphosphine, and an S-containing compound such as polymethylthiostyrene and polyphenylthiostyrene.

Further, the polymerizable organic compound includes a nitrogen containing monomer such as vinylpyridine, vinylimidazole, vinyloxazoline, vinylbenzyldimethylamine and vinylbenzyldiethylamine, a phosphorus containing monomer such as styryldiphenylphosphine, and a sulfur containing monomer such as methylthiostyrene.

The above mentioned polyfunctional quaternarizing agent used when forming the ion-exchange resin has, as described above, two types, one for a halogen atom containing organic compound and the other for an organic compound containing a lone pair of electrons. A variety of agents including the above mentioned examples can be used as described above as far as it shows said functions to said organic compound, without particular limitation.

Further, as an electrode catalyst which forms the gas diffusion electrode membrane together with the anion-exchange resin, as described above, a metallic particle which promotes oxidation reaction of hydrogen and reduction reaction of oxygen, used as an electrode catalyst in the conventional gas diffusion electrode, can be used without any limitation. As for this, the above mentioned specific examples can be used.

In the production method of the present invention, as described above, it is preferable to use the polyfunctional quaternarizing agent in a form of a paste composition including itself, the organic compound primary material and an electrode catalyst for forming an electrode membrane. In this case, a compounding ratio of the polyfunctional quaternarizing agent and the organic compound primary material for forming an electrode membrane is not particularly limited and may be properly determined depending on the property of the desiable ion-exchange resin. From a viewpoint that the property of the obtained ion-exchange resin is good, a ratio (B/A), wherein A is a total number of moles of halogen atoms in said polyfunctional quaternarizing agent or organic compound for forming an ion-exchange resin and B is a total number of moles of atoms having a lone pair of electrons in said polyfunctional quaternarizing agent or organic compound for forming an ion-exchange resin, is preferably within the range of 0.05 to 20.0, particularly preferably within the range of 0.1 to 10.0.

In this case, generally, since the ion-exchange resin in the gas diffusion electrode membrane or the solid electrolyte membrane is required to have the above mentioned ion-exchange capacity and to be hardly dissolved in water and methanol. To satisfy it, other monomers polymerizable to the monomers used for producing said halogen atom containing polymeric organic compound and polymeric organic compound containing a lone pair of electrons can be added for a purpose of controlling the property of these polymeric organic compounds If needed.

The other monomers include a vinyl compound such as ethylene, propylene, butylene, acrylonitrile, vinyl chloride and acrylic acid ester, for example.

An amount of other monomer is not particularly limited and may be properly determined depending on the property of the desirable ion-exchange resin, but normally, it is in a range of 0 to 100 parts by mass to a total of 100 parts by mass of the polymerizable organic compound for forming an anion-exchange resin membrane.

Further, a polymerization method when using these monomers may be, depending on the of the monomers, a known polymerization method such as radical polymerization, cation polymerization and anion polymerization. When the cross-linking reaction is performed by heat, the polymerization can be done simultaneously, and it is preferred to use radical polymerizable monomer since high-molecular-weight polymer can be easily obtained by radical polymerization.

Note that in this case, a known radical polymerization initiator can be used without particular limitation.

Also, "to be hardly dissolved in water and methanol" means that a solubility to water or methanol at 20° C. (a concentration of the above ion-exchange resins in a saturated solution) is less than 1 mass %, preferably 0.8 mass % or less.

In case that the obtained ion-exchange resin is easily dissolved in water or methanol, the elastomer is eluted from the gas diffusion electrode membrane, resulting in reduction of battery performance.

Amounts of the compounds are not particularly limited, but from a viewpoint of ion conductivity, it is preferably 5 to 80 mass %, particularly preferably 20 to 50 mass % to 100 parts by mass of the later described conductive agent which supports an electrode catalyst (metallic component).

In the production method of the present invention, when obtaining the paste composition, the organic compound for forming an ion-exchange resin and polyfunctional quaternarizing agent are first prepared in a form of a solution or suspension, and then, the electrode catalyst is mixed to make the paste composition.

The solvent used to obtain the solution is not particularly limited as far as it dissolves both of said compounds, but a low-boiling organic solvent is preferred because of easiness in drying operation.

To take some examples of the preferably used organic solvent, there may be mentioned dichloroethane, chloroform, methanol, ethanol, 1-propanol, 2-propanol, methyl ethyl ketone, acetonitrile, nitromethane, tetrahydrofuran, dioxane, N,N-dimethylformamide, toluene, etc.

Concentrations of both of said compounds in the solution is not particularly limited, and may be properly determined depending on a combination of the solvent and said compounds, amounts used to the electrode catalyst, viscosity, permeability at applying it, etc., but it is preferably 1 to 20 mass %, particularly preferably 1 to 15 mass %, as a total mass % of both of the compounds in a solution.

Note that when said organic compound for forming an ion-exchange resin and polyfunctional quaternarizing agent are used in a form of suspension, dispersion media are not particularly limited, and water can be used as well as any among the above mentioned organic solvents which does not dissolve both of said compounds. Further, contents of both of said compounds in the suspension are not particularly limited and are preferably equivalent to the concentrations in the form of solution.

To prepare said paste composition by using the solution or the suspension, predetermined amounts of the above solution or suspension and the electrode catalyst are mixed and kneaded.

In this case, when using a low-molecular-weight compound as said organic compound for forming an ion-exchange resin, it is preferred to add a binding agent to secure viscosity of the above paste composition and to form this in a certain thickness on a support, and the binding agent generally includes a variety of thermoplastic resins.

To take an example of preferably used thermoplastic resin, there may be mentioned polyvinyl chloride, polytetrafluoroethylene, polyvinylidene fluoride, tetrafluoroethylene-perfluoroalkyl vinyl ether copolymer, polyether ether ketone, polyether sulfone, styrene-isoprene copolymer, hydrogenerated acrylonitrile-butadiene copolymer, etc.

The content is preferably 5 to 30 parts by mass with respect to 100 parts by mass of the conductive agent which supports the above electrode catalyst (metallic component).

Note that the thermoplastic resin of said binding agent may be used singly or as a mixture of 2 or more. Further, as far as not disturbing effects of the present invention, a conventionally known ion-conductivity providing agent or other additives may be added.

Membrane formation method by using the above obtained paste composition is not particularly limited, and can be roll-film method, for example. Normally, a membrane is formed on the solid polymer electrolyte membrane or a support such as carbon paper.

Then, according to this normal method, in the present invention, said paste composition is applied to form a membrane directly on the quaternary base anion-exchange resin precursor membrane for forming a solid electrolyte membrane, or on a support such as carbon paper, the former of which is preferable as described above.

Namely, in the production method of the present invention, when using the quaternary base anion-exchange resin precursor membrane for forming a solid electrolyte membrane as a support and applying said paste composition to form a membrane directly thereon, the molded membrane for forming a gas diffusion electrode membrane and the quaternary base anion-exchange resin precursor membrane are jointed at the same time of membrane formation, so that it is a simple and efficient desirable production method.

On the other hand, when forming a membrane by applying said paste composition on the other supports, it is necessary to perform desired processings for the formed molded membrane for forming a gas diffusion electrode membrane and anion-exchange resin precursor membrane if needed, and then to joint the membranes.

Therefore, hereinafter, a membrane formation method of a quaternary base anion-exchange resin precursor membrane for forming a solid electrolyte membrane wherein the simple method is applicable will be first described specifically and in detail.

In the present invention, said quaternary base anion-exchange resin precursor membrane can be obtained in the following method.

Namely, said quaternary base anion-exchange resin precursor can be obtained by polymerizing a monomer composition composed of a monomer having a functional group capable of introducing a quaternary base forming functional group or a monomer having a quaternary base forming functional group, a crosslinkable monomer and a polymerization initiator, and introducing a quaternary base forming functional group if needed. This method can be preferably used for producing the quaternary base anion-exchange resin precursor membrane.

As the above quaternary base forming functional group, there may be mentioned primary to tertiary amino groups, pyridyl group, imidazole group, phosphonium group, sulfonium group, etc. Since the finally obtained anion-exchange group is preferably a quaternary ammonium group and a quaternary pyridinium group, which are strongly-basic groups in anion conductivity, primary to tertiary amino groups and pyridyl group are preferable as a precursor of the anion-exchange group.

An amount of the anion-exchange groups of the electrolyte membrane portion in the finally obtained electrolyte membrane-electrode membrane assembly is not particularly limited, but from a viewpoint of lowering an electric resistance value of the above obtained anion-exchange membrane and providing a good electric efficiency at an electric generation, it is preferably 0.2 to 5.0 mmol/g, particularly preferably 0.5 to 3.0 mmol/g, in anion-exchange capacity.

Also, as for the polymeric compound portion which forms the anion-exchange resin of the finally obtained electrolyte membrane, any known compounds such as polystyrene based, polyolefin based, fluorinated polyolefin based, polysulfone based and polyimide based can be used, and polystyrene based are preferable in superior stability and lower cost.

As a monomer having a functional group formable of such a polymeric compound portion and capable of introducing the ion-exchange group, i.e. a monomer capable of introducing the quaternary base forming functional group and a monomer having a quaternary base forming functional group, any one used in a production of a conventionally known ion-exchange resin can be used without particular limitation.

Specifically, as the former, i.e., the monomer capable of introducing the quaternary base forming functional group, there may be mentioned styrene, vinyl toluene, α-methylstyrene, vinylnaphthalene, etc.

As the latter, i.e. the monomer having a quaternary base forming functional group, there may used a halogenated alkyl group containing monomer such as chloromethylstyrene, an amine-based monomer such as vinylbenzyl trimethylamine and vinylbenzyl triethylamine, a nitrogen containing heterocycle-based monomer such as vinylpyridine and vinylimidazole, and salts and esters thereof.

Note that when using a monomer having a functional group capable of introducing a quaternary base forming functional group, a known treatment for introducing a quaternary base forming functional group, i.e. amination, alkylation, chloromethylation, etc., may be conducted after polymerization to introduce a desired quaternary base forming functional group and to obtain a quaternary base anion-exchange resin precursor.

Also, when forming the quaternary base anion-exchange resin precursor membrane in the present invention, in addition to the above monomer components, it is possible to add a crosslinkable monomer to crosslink a resin which becomes the above quaternary base anion-exchange resin precursor, and in the present invention, it is desirable in view of water resistance, durability or fuel permeability, etc., to use the resin crosslinked thereby.

As these crosslinkable monomers, although not particularly limited, for example, a polyfunctional vinyl compound such as divinylbenzenes, divinylsulfone, butadiene, chloroprene, divinylbiphenyl and trivinylbenzene, and a polyfunctional methacrylic acid derivative such as trimethylolmethane trimethacrylate ester, methylenebisacrylamide, hexamethylene dimethacryl amide can be used.

Further, in addition to the above monomer which becomes the quaternary base anion-exchange resin precursor and the crosslinkable monomer, other monomers copolymerizable with these monomers and plasticizers may be added.

As these other monomers, for example, there may be used styrene, acrylonitrile, methylstyrene, acrolein, methylvinyl ketone, vinyl biphenyl, etc.

As the said plasticizers, there may be used dibutyl phthalate, dioctyl phthalate, dimethyl isophthalate, dibutyl adipate, triethyl citrate, acetyl tributyl citrate, dibutyl sebacate, etc.

As a polymerization initiator to obtain the quaternary base anion-exchange resin precursor followed by polymerization of these monomer components, any conventionally known compound can be used without particular limitation.

As a specific example of such a polymerization initiator, there can be mentioned an organic peroxide such as octanoyl peroxide, lauroyl peroxide, t-butylperoxy-2-ethylhexanoate, benzoyl peroxide, t-butylperoxy isobutylate, t-butylperoxy laurate, t-hexylperoxy benzoate or di-t-butylperoxide.

Composition of each monomer used for producing the quaternary base anion-exchange resin precursor used in the present invention may be properly determined depending on required performance of the finally obtained ion-exchange resin membrane, and generally, the crosslinkable monomer is 0.1 to 50 parts by mass, preferably 1 to 40 parts by mass; other monomers copolymerizable with these monomers are 0 to 100 parts by mass; plasticizers are 0 to 50 parts by mass, with respect to 100 parts by mass of the monomer having a functional group capable of introducing a quaternary base forming functional group or monomer having a quaternary base forming functional group. The polymerization initiator is, with respect to 100 parts by mass of all monomers, 0.1 to 20 parts by mass, preferably 0.5 to 10 parts by mass.

Further, a membrane thickness of quaternary base anion-exchange resin precursor membrane of the present invention is preferably 5 to 150 μm, more preferably 10 to 130 μm.

Note that the thicker the finally obtained ion-exchange resin membrane is, the higher the physical strength tends to be; on the other hand, the thinner results in insufficient physical strength as a membrane which is difficult to use. However, when too thick, electric resistance of the ion-exchange membrane becomes high, and fuel cell output tends to deteriorate.

Also, such a quaternary base anion-exchange resin precursor membrane generally includes a membrane consisting only of the quaternary base anion-exchange resin precursor and a membrane wherein a porous membrane, which is a substrate, is impregnated with the quaternary base anion-exchange resin precursor. In the present invention, either of said membranes may be used, and it is preferable in uniformity of the electrolyte membrane to use a membrane wherein a porous membrane, which is a substrate, is impregnated with the quaternary base anion-exchange resin precursor.

When the quaternary base anion-exchange resin precursor membrane is produced by impregnating the porous membrane which is a substrate (support) with the quaternary base anion-exchange resin precursor, the substrate may be any known one as well, and woven fabric or unwoven fabric, and a porous membrane can be used without any limitation. Materials for forming these substrates are exemplified as below.

Namely, there can be used, without particular limitation, a polyolefin resin including a homopolymer or copolymer of α-olefin such as ethylene, propylene, 1-butene, 1-pentene, 1-hexene, 3-methyl-1-butene, 4-methyl-1-pentene and 5-methyl-1-heptene; a vinyl chloride based resin such as polyvinyl chloride, vinyl chloride-vinyl acetate copolymer, vinyl chloride-vinylidene chloride copolymer and vinyl chloride-olefin copolymer; a fluorine based resin such as polytetrafluoroethylene, polychlorotrifluoroethylene, polyvinylidene fluoride, tetrafluoroethylene-hexafluoropropylene copolymer, tetrafluoroethylene-perfluoroalkyl vinyl ether copolymer and tetrafluoroethylene-ethylene copolymer; polyamide resin such as nylon 6 and nylon 66; and the like.

Because of the superior mechanical strength, chemical stability, and chemical resistance, and good compatibility with a hydrocarbon-based ion-exchange resin, the substrate used is preferably comprised of a porous membrane made from thermoplastic resin of a polyolefin resin such as polyethylene, polypropylene and polymethylpentene which is low in gas permeability and able to be made thin.

Note that these substrates may either have an anion-exchange group or not.

Also, the porous membrane is not particularly limited in its property, but it is preferable that average pore diameter is 0.005 to 5.0 μm, particularly 0.01 to 2.0 μm, and porosity is 20 to 95%, particularly 30 to 90% in order to reduce the electric resistance of the finally obtained ion-exchange membrane and to retain high physical strength.

Further, the thickness is preferably 5 to 150 μm, particularly preferably 10 to 120 μm, so that the obtained ion-exchange membrane has aforementioned thickness.

Forming method of the above mentioned quaternary base anion-exchange resin precursor membrane on the substrate is not particularly limited, and it is preferably formed by, for example, applying, spraying or impregnating said material composition mentioned as a material for the quaternary base anion-exchange resin precursor on the substrate, followed by polymerization.

Note that for applying of the above material composition to the substrate, for example, there may be employed a method to contact the both under reduced pressure or to pressurize after contacting the both so that the material composition is well filled into a void (pore) of the porous membrane used as the substrate.

Further, when polymerizing the material monomer composition (monomer) applied to or impregnated in the substrate, a method including sandwiching the substrate between films such as polyester and applying pressure while rising a temperature from normal temperature to thereby polymerize the material monomer composition is preferred to be employed, and the polymerization conditions may be properly determined depending on the of the used polymerization initiator or constitution of the monomer composition, etc.

In the production method of the present invention, when forming a molded membrane for forming an electrode membrane, as described above, the quaternary base anion-exchange resin precursor membrane for forming a solid electrolyte membrane can be used as a support, so that it is preferable to form a membrane of aforementioned paste composition including an electrode catalyst, a conductive agent, quaternary base anion-exchange resin precursor and polyfunctional quaternarizing agent directly thereon. In this case, the quaternary base anion-exchange resin precursor membrane which becomes the support is preferably polymerized prior to membrane formation.

As a method for forming the membrane of the paste composition directly on the support, there is a method to print or apply the composition on the precursor membrane.

Further, the membrane formation method of a paste composition is not limited to the above, and may include a method to first apply it on a blank and to then transfer it to the quaternary base anion-exchange resin precursor membrane, which is a support.

Also, in the production method of the present invention, it is possible to independently form a membrane using said paste composition, to stack the formed membrane and the quaternary base anion-exchange resin precursor membrane, and then to joint the two membranes by a treatment such as pressure bonding if needed. In addition, in the production method of the present invention, said paste composition may not necessarily include said polyfunctional quaternarizing agent. In this case, a polyfunctional quaternarizing agent may be included in the solution of the organic compound primary material for forming an electrolyte membrane to form the membrane as described above. Further, on the surface of said precursor membrane or the molded membrane of said paste composition, the solution containing the polyfunctional quaternarizing agent may be applied, followed by jointing two membranes.

Further referring to the jointing method in the latter case, on said precursor membrane, the molded membrane of said paste composition can be formed after applying the solution containing the polyfunctional quaternarizing agent on the precursor membrane, or said precursor membranes can be jointed after applying the solution containing the polyfunctional quaternarizing agent on an independently formed molded membrane of said paste composition.

The quaternary base anion-exchange resin precursor membrane and the membrane of the paste composition are formed as described above. After the membrane formation, each functional group of the polyfunctional quaternarizing agent around the bonded interface between the two membranes is reacted with the quaternary base forming functional group present in the membranes to form a quaternary base anion-exchange group, and a cross-linked structure is formed between the membranes.

In this case, to increase amount of the polyfunctional quaternarizing agent around the bonded interface and to form the cross-linked structure more strongly, it is preferred to sufficiently permate the polyfunctional quaternarizing agent in a membrane wherein this agent is not present.

For example, when forming a molded membrane for forming a gas diffusion membrane by using a paste composition containing a polyfunctional quaternarizing agent, etc., the polyfunctional quaternarizing agent is preferably permeated in the quaternary base anion-exchange resin precursor membrane. Also, when applying the polyfunctional quaternarizing agent so that this agent is present between said precursor membranes and said molded membrane, the polyfunctional quaternarizing agent, etc. is preferably permated in both membranes.

In the production method of the present invention, membrane formation by said paste composition can be performed not only on the quaternary base anion-exchange resin precursor membrane but also on the other support as described above. In this case, the paste composition including said electrode catalyst is filled in a void and adhered on a surface of a support material so as to have a thickness of 5 to 50 µm to form the membrane.

As a support material used in this case, the porous substrate used for said precursor membrane can be preferably used.

As other support materials, a porous membrane such as carbon fiber fabric and carbon paper is normally used. It is preferable that these support materials are 50 to 300 µm in thickness, and 50 to 90% in porosity.

In the production method of the present invention, the quaternary base forming functional group around the bonded interface between thus obtained precursor membrane (molded membrane) of an anion-exchange resin forming a gas diffusion electrode membrane formed by the paste composition and an anion-exchange resin precursor membrane forming a solid electrolyte membrane is transformed to an anion-exchange group by using the polyfunctional quaternarizing agent in a condition wherein both of the membranes are jointed while forming a cross-linked structure.

In this case, the cross-link can be initiated only with jointing of the membranes as described above, which is slow in reaction rate, and therefore it is preferable to heat to increase the reaction rate.

In the present invention, when forming the ion-exchange group as described above, a halogen atom containing organic compound and an organic compound containing a lone pair of electrons are used in combination, and the cross-linked structure can be easily formed via the polyfunctional quaternarizing agent by heating treatment.

Heating conditions for the cross-link in this case may be properly determined in view of the and combination of the used compound, thermal resistance of used support materials, etc., and in general, heating temperature is 40 to 200° C., preferably 80° C. to 120° C., and heating time is 5 to 120 minutes or so.

The heating treatment can be done as a thermocompression treatment at jointing of the molded membrane for forming a gas diffusion electrode membrane with the anion-exchange resin precursor membrane; and the apparatus used therefor is the pressure-applicable and warmable one, and generally includes a hot pressing machine, a roll pressing machine, etc.

Pressing temperature may be equal to or higher than a glass transition temperature of the ion-exchange resin or precursor thereof, which forms the solid electrolyte membrane or gas diffusion electrode membrane, and is generally 80° C. to 200° C.; and pressing pressure depends on a thickness and hardness of the used gas diffusion electrode membrane and normally 0.5 to 20 MP.

Note that in the production method of a solid electrolyte membrane-electrode membrane assembly of the present invention, the gas diffusion electrode membrane may be formed in at least one face of the solid electrolyte membrane, and a gas diffusion electrode membrane produced in a conventional method may be formed on the other face.

By performing such a heating treatment, in the above mentioned mechanism, a functional group for forming an ion-exchange group present around the bonded interface of both of the gas diffusion electrode membrane and solid electrolyte membrane is transformed into an ion-exchange group, the resulting onium salt portion acts as an anion-exchange group, and an ion-exchange resin is formed in both of the gas diffusion electrode membrane and solid electrolyte membrane. Along with it, a cross-linked structure is formed between both ion-exchange resins via the polyfunctional quaternarizing agent.

Also, the ion-exchange resin functions as an ion-conductivity providing agent, and said molded membrane after heating treatment results in functioning as a gas diffusion electrode membrane.

Therefore, the gas diffusion electrode membrane after heating treatment can be definitely used as is, but it is preferable to further perform a quaternarizing treatment because of the following reason.

Namely, in a preferred embodiment of the production method according to the present invention, the polyfunctional quaternarizing agent is included in the paste composition for forming the gas diffusion electrode membrane, and a part of it is permeated from the bonded interface into the quaternary base anion-exchange resin precursor membrane.

Therefore, in the quaternary base anion-exchange resin precursor membrane, it is difficult for the polyfunctional quaternarizing agent to reach the inside, and as a result, most of the quaternary base forming functional groups inlaying of the precursor membrane substantially remain intact without quaternarization.

Also, in the molded membrane for forming a gas diffusion electrode membrane, it is normally difficult to quaternarize all functional groups of the used polymeric compound having a quaternary base forming functional group via the polyfunctional quaternarizing agent, and a large amount of quaternary base forming functional groups remains intact without quaternarization depending on the amount used or the presence of the polyfunctional quaternarizing agent.

Such a remaining functional group is inferior in ion conductivity compared to the quaternary base anion-exchange group, and it is preferred to further quaternarize for obtaining high output.

In the quaternarinzing treatment, any of various quaternarizing agent can be used without particular limitation as far as it allows changing the remaining quaternary base forming functional groups to the quaternary base anion-exchange groups, and any method generally used in such a quaternarizing treatment can be readily employed.

Namely, when the quaternary base forming functional group is a halogen atom containing organic group, the quaternarization may be done by a dip treatment into an aqueous solution or a solution using an organic solvent of a compound including an organic group containing an atom having a lone pair of electrons.

On the other hand, when the quaternary base forming functional group is an organic group containing an atom having a lone pair of electrons such as amine containing compound and nitrogen-containing heterocyclic compound, the quaternarization may be done by a dip treatment into an aqueous solution or a solution using an organic solvent of a halogen atom containing compound.

As described above, the gas diffusion electrode membrane after heating treatment can be definitely used without any additional treatment as well as the gas diffusion electrode membrane after quaternarization of the remaining quaternary base forming functional group, but it is preferable to substitute a halogen ion, which is a counter anion of an onium ion of the above onium salt portion to become the anion-exchange group, with a hydroxide ion before use because of high output property.

The substitution of said halogen ion with the hydroxide ion is preferably performed after quaternarization of the remaining quaternary base forming functional group, and can be easily done by treatment with an alkaline aqueous solution.

Note that the substitution to said hydroxide ion can be performed after said heating treatment, but preferably done after the further quaternarization as described above.

Then, according to the production method of the present invention, an electrolyte membrane-electrode membrane assembly for a solid polymer fuel cell is prepared, and placed in a solid polymer fuel cell with said basic structure shown in FIG. 1 to obtain a solid polymer fuel cell of the present invention and to evaluate the performance.

Hereinafter, electrolyte membrane-electrode membrane assemblies of Examples and Comparative Examples of the present invention will be described, but the present invention is not limited to these examples.

As for solid polymer fuel cells wherein electrolyte membrane-electrode membrane assemblies of the examples and comparative examples are placed, evaluation was performed on each of properties including (1) fuel cell output voltage, (2) durability, and (3) bonding property as below.

(1) Fuel Cell Output Voltage The electrolyte membrane-electrode membrane assembly is sandwiched in both sides by carbon paper electrodes with a thickness of 200 μm and a porosity of 80%, and built in the fuel cell having a structure shown in FIG. 1. At a pressure of 2 atm, a fuel cell temperature of 50° C. and a wetting temperature of 50° C., oxygen and hydrogen were supplied in 200 (ml/min.) and 400 (ml/min.), respectively, to perform a power generation test and to measure terminal voltages of the cell at current densities of 0 ($A/cm^2$), 0.3 ($A/cm^2$) and 1.0 ($A/cm^2$).

(2) Durability Evaluation

After measurements of said output voltage, a continuous power generation test was performed under conditions of a cell temperature of 50° C. and a current density of 0.3 $A/cm^2$, to measure an output voltage after 250 hours and to evaluate a durability of a hydroxide ion-conductivity providing agent.

(3) Bonding Property Evaluation

By using an assembly immediately after production, in accordance with cross-cut tape method of JISK-5400, a tape peel test was performed. After the tape peeling, a condition of the gas diffusion electrode membrane remaining on the anion-exchange membrane was visually evaluated by 10-point method as the bonding property immediately after production.

Also, the assembly was removed from the cell after continuous electric generation for 250 hours at 0.3 A/cm$^2$ in the above mentioned fuel cell output test to perform the same tape peel test as that immediately after production and to evaluate the bonding property.

Example 1

First, a porous membrane made of polyethylene is used as a substrate to form a membrane for forming a solid electrolyte membrane (membrane of vinylpyridine-divinylbenzene copolymer or chloromethylstyrene-divinylbenzene copolymer), which was adjusted to have a thickness of 30 μm and an ion-exchange capacity after making a quaternary base of 2.4 mmol/g, shown in Table 1. On the membrane, a paste composition, obtained by mixing a carbon black supporting 50 mass % of platinum having an average particle size of 2 nm as an electrode catalyst, an organic compound for forming an ion-exchange resin, functionalized quaternarizing agent and an organic solvent in mass ratios shown in Table 1, was applied and dried at 25° C. for 6 hours.

Next, thus obtained membrane-shaped material was hot pressed at 100° C. under a pressure of 5 MPa for 100 seconds, and then left at room temperature for 2 minutes.

Following this, in order to promote a quaternary base forming treatment for remaining quaternary base forming functional groups other than those wherein quaternary bases were formed with the polyfunctional quaternarizing agent, the membrane-shaped material was dipped in a water-acetone mixed solution including 5 mass % of the quaternarizing agent shown in Table 1 for 16 hours, and further dipped in 0.1 mol/l of sodium hydroxide solution to substitute a halogen ion, i.e. a counter anion, with a hydroxide ion, so that electrolyte membrane-electrode membrane assembly was prepared.

TABLE 1

| | Membrane composition for forming a solid electrolyte membrane | Electrode membrane composition [parts by weight] | | | |
| --- | --- | --- | --- | --- | --- |
| | | Organic compound for forming an ion exchange resin | Bifunctional quaternarizing agent | Organic Solvent | Quaternarizing agent |
| Example 1-1 | chloromethylstyrene-divinylbenzene copolymer | chloromethylstyrene-styrene copolymer [80] | N, N, N', N'-tetramethyl-1,6-hexanediamine [5] | Tetrahydrofuran [15] | trimethylamine |
| Example 1-2 | chloromethylstyrene-divinylbenzene copolymer | chloromethylstyrene-styrene copolymer [60] | N, N, N', N'-tetramethyl-1,6-hexanediamine [10] | Tetrahydrofuran [10] | trimethylamine |
| Example 1-3 | vinylpyridine-divinylbenzene copolymer | vinylpyridine-styrene copolymer [80] | 1,6-diiodohexane [5] | Tetrahydrofuran [15] | methyl iodide |
| Example 1-4 | vinylpyridine-divinylbenzene copolymer | vinylpyridine-styrene copolymer [60] | 1,6-diiodohexane [10] | Tetrahydrofuran [10] | methyl iodide |

In the prepared gas diffusion electrode membrane of the resulting electrolyte membrane-electrode membrane assembly, the content of the ion-exchange resin which is an ion-conductivity providing agent per a conductive agent (carbon black) supporting an electrode catalyst (platinum) was 20 mass %, and the content of the platinum with respect to the gas diffusion electrode membrane was 1.2 mg/cm².

After thus obtained electrolyte membrane-electrode membrane assembly was built in a fuel cell, a fuel cell output voltage, bonding property and durability were measured.

The results are shown in Table 4.

Example 2

A membrane for forming a solid electrolyte membrane (a membrane of vinylpyridine-divinylbenzene copolymer or chloromethylstyrene-divinylbenzene copolymer) shown in Table 2 with a thickness of 30 µm was formed on the same substrate as Example 1. On the membrane, a mixed solution of a polyfunctional quaternarizing agent and an organic solvent in mass ratios shown in Table 2 was applied. After that, a paste composition, obtained by mixing a carbon black supporting 50 mass % of platinum having an average particle size of 2 nm as an electrode catalyst, an organic compound for forming an ion-exchange resin and an organic solvent shown in Table 2 in mass ratios shown in Table 2, was applied and dried at 25° C. for 6 hours. Next, thus obtained membrane-shaped material was hot pressed at 100° C. under a pressure of 5 MPa for 100 seconds, and then left at room temperature for 2 minutes.

Following this, in order to promote a quaternary base forming treatment for remaining quaternary base forming functional groups other than those wherein quaternary bases were formed with the polyfunctional quaternarizing agent, the membrane-shaped material was dipped in a water-acetone mixed solution including 5 mass % of the quaternarizing agent shown in Table 2 for 16 hours, and further dipped in 0.1 mol/l of sodium hydroxide solution to substitute a halogen ion, i.e. a counter anion, with a hydroxide ion, so that electrolyte membrane-electrode membrane assembly was prepared.

After thus obtained electrolyte membrane-electrode membrane assembly was built in a fuel cell, a fuel cell output voltage, bonding property and durability were measured.

The results are also shown in Table 4 showing the results of Example 1.

Comparative Examples

An anion-exchange membrane with an anion-exchange capacity of 2.4 mmol/g and a thickness of 30 µm was formed on the same substrate as Example 1. In Comparative Example 1, a vinylpyridine-divinylbenzene copolymer was quaternarized with methyl iodide to form a pyridinium group, and in Comparative Example 2, a chloromethylstyrene-divinylbenzene copolymer was quaternarized with trimethylamine to form a trimethylammonium group. On the membrane, a paste composition, obtained by mixing a carbon black supporting 50 mass % of platinum having an average particle size of 2 nm as an electrode catalyst, a quarternarizing agent and an organic solvent shown in Table 3 in mass ratios shown in Table 3, was applied and dried at 25° C. for 6 hours.

Next, thus obtained membrane-shaped material was hot pressed at 100° C. under a pressure of 5 MPa for 100 seconds, and then left at room temperature for 2 minutes.

Following this, in order to promote a quaternary base forming treatment for remaining quaternary base forming functional groups other than those wherein quaternary bases were

TABLE 2

|  | Membrane composition for forming a solid electrolyte membrane | (Intermediate layer composition) | | Electrode membrane composition [parts by weight] | | |
|---|---|---|---|---|---|---|
|  |  | Bifunctional quaternarizing agent | Organic Solvent | Organic compound for forming an ion exchange resin | Organic Solvent | Quaternarizing agent |
| Example 2-1 | chloromethylstyrene-divinylbenzene copolymer | N, N, N', N'-tetramethyl-1,6-hexanediamine [5] | tetrahydrofuran [15] | chloromethylstyrene-styrene copolymer [80] | tetrahydrofuran [20] | trimethylamine |
| Example 2-2 | vinylpyridine-divinylbenzene copolymer | 1,6-diiodohexane [5] | tetrahydrofuran [15] | vinylpyridine-styrene copolymer [80] | tetrahydrofuran [20] | methyl iodide |

In the prepared gas diffusion electrode membrane of the resulting electrolyte membrane-electrode membrane assembly, the content of the ion-exchange resin which is an ion-conductivity providing agent per a conductive agent (carbon black) supporting an electrode catalyst (platinum) was 20 mass %, and the content of the platinum with respect to the gas diffusion electrode membrane was 1.2 mg/cm².

formed with the polyfunctional quaternarizing agent, the membrane-shaped material was dipped in a water-acetone mixed solution including 5 mass % of the quaternarizing agent shown in Table 3 for 16 hours, and further dipped in 0.1 mol/l of sodium hydroxide solution to substitute a halogen ion, i.e. a counter anion, with a hydroxide ion, so that electrolyte membrane-electrode membrane assembly was prepared.

TABLE 3

| | Membrane composition for forming a solid electrolyte membrane | Organic compound for forming an ion exchange resin | Bifunctional quaternizing agent | Organic Solvent | Quaternizing agent |
|---|---|---|---|---|---|
| Comparative Example 1 | chloromethylstyrene-divinylbenzene copolymer | chloromethylstyrene-styrene copolymer [80] | N, N, N', N'-tetramethyl-1, 6-hexanediamine [5] | tetrahydro-furan [15] | trimethylamine |
| Comparative Example 2 | vinylpyridine-divinylbenzene copolymer | vinylpyridine-styrene copolymer [80] | 1,6-diiodohexane [5] | tetrahydro-furan [15] | methyl iodide |

In the prepared gas diffusion electrode membrane for forming an electrolyte membrane-electrode membrane assembly, the content of the ion-exchange resin which is an ion-conductivity providing agent per a conductive agent (carbon black) supporting an electrode catalyst (platinum) was 20 mass %, and the content of the platinum with respect to the gas diffusion electrode membrane was 1.2 mg/cm$^2$.

After thus obtained electrolyte membrane-electrode membrane assembly was built in a fuel cell, a fuel cell output voltage, bonding property and durability were measured.

The results are also shown in Table 4 with the results of Examples 1 and 2.

TABLE 4

| | Fuel Cell Voltage [V] | | | Durability Evaluation (after 250 hour power generation) | Bonding Property Evaluation | |
|---|---|---|---|---|---|---|
| | | | | | Immediately after | 250 hours |
| Example No. | 0 A/cm$^2$ | 0.3 A/cm$^2$ | 1.0 A/cm$^2$ | 0.3 A/cm$^2$ | production | later |
| 1-1 | 1.05 | 0.69 | 0.65 | 0.64 | 10 | 10 |
| 1-2 | 1.00 | 0.65 | 0.64 | 0.61 | 10 | 10 |
| 1-3 | 1.03 | 0.68 | 0.64 | 0.62 | 10 | 10 |
| 1-4 | 1.01 | 0.66 | 0.66 | 0.63 | 10 | 10 |
| 2-1 | 0.93 | 0.62 | 0.59 | 0.60 | 10 | 8 |
| 2-2 | 0.94 | 0.60 | 0.60 | 0.59 | 10 | 8 |
| Comparative Example 1 | 0.93 | 0.56 | 0.51 | 0.30 | 8 | 4 |
| Comparative Example 2 | 0.92 | 0.57 | 0.53 | 0.28 | 8 | 5 |

Bonding Property Evaluation: fuel cell voltage after 250 hour power generation [V]

Each property, i.e. fuel cell output voltage, durability and bonding property, measured by using the solid polymer fuel cells wherein the electrolyte membrane-electrode membrane assemblies of Examples and Comparative Examples of the present invention were equipped is shown in said Table 4.

According to the results in Table 4, the properties of Examples are all superior to those of Comparative Examples, and these evaluation results clearly indicate that the present invention provides prominent effects.

INDUSTRIAL APPLICABILITY

A bonding of a gas diffusion electrode membrane and a solid electrolyte membrane in the present invention, which is a chemical bonding, is qualitatively different from that of a conventional solid electrolyte membrane and gas diffusion electrode membrane, stronger and superior in bonding properties.

result, fuel cell wherein an electrolyte membrane-electrode membrane assembly of the present invention is used can be further improved in thermal resistance and chemical resistance as well as further increased durability of the battery itself and much superior water resistance and durability, without peeling of the solid electrolyte membrane and the gas diffusion electrode membrane even when using methanol as a fuel.

The invention claimed is:

1. An electrolyte membrane-electrode membrane assembly for a solid polymer fuel cell, wherein
   a gas diffusion electrode membrane formed with a quaternary base anion-exchange resin and an electrode catalyst is bonded to a solid electrolyte membrane formed with a quaternary base anion-exchange resin;
   at least a part of the quaternary base anion-exchange groups of the anion-exchange resin included in the gas diffusion electrode membrane and solid electrolyte membrane around the bonded interface is bonded each other via the quaternary base forming functional group of each ion-exchange resin and functional groups of a polyfunctional quaternarizing agent; and
   the anion-exchange resins included in the gas diffusion electrode membrane and solid electrolyte membrane are crosslinked via the polyfunctional quaternarizing agent.

2. The electrolyte membrane-electrode membrane assembly for a solid polymer fuel cell as set forth in claim 1, wherein the polyfunctional quaternarizing agent is a bifunctional quaternarizing agent.

3. The electrolyte membrane-electrode membrane assembly for a solid polymer fuel cell as set forth in claim 1, wherein the anion-exchange groups in the anion-exchange resins included in the gas diffusion electrode membrane and solid electrolyte membrane are quaternary ammonium bases, and the polyfunctional quaternarizing agent is an alkyl diamine.

4. The electrolyte membrane-electrode membrane assembly for a solid polymer fuel cell as set forth in claim 1, wherein
the anion-exchange groups in the anion-exchange resins included in the gas diffusion electrode membrane and the solid electrolyte membrane are pyridinium bases; and the polyfunctional quaternarizing agent is a dihaloalkane.

5. A solid polymer fuel cell comprising the electrolyte membrane-electrode membrane assembly for a solid polymer fuel cell as set forth in any one of claims 1 to 4.

6. A production method of a gas diffusion electrolyte membrane-electrode membrane assembly for a solid polymer fuel cell comprising steps of:
jointing a molded membrane for forming a gas diffusion electrode membrane, formed with a paste composition including a polymeric organic compound having a quaternary base forming functional group and an electrode catalyst, with a quaternary base anion-exchange resin precursor membrane for forming a solid electrolyte membrane having a quaternary base forming functional group;
forming of a quaternary base anion-exchange group by bonding a polyfunctional quaternarizing agent to a quaternary base forming functional group included in each of said molded membrane and said precursor membrane via each functional group of the polyfunctional quaternarizing agent which is present around the bonded interface of both membranes to thereby crosslink the formed anion-exchange resins in both membranes via the polyfunctional quaternarizing agent simultaneously; and
subjecting non-quaternarized residue of the quaternary base forming functional groups in thus-obtained assembly to a quaternary base forming treatment.

7. The production method of the gas diffusion electrolyte membrane-electrode membrane assembly for a solid polymer fuel cell as set forth in claim 6, wherein
the paste composition contains the polyfunctional quaternarizing agent; and the polyfunctional quaternarizing agent is present in the bonded interface of the molded membrane for forming a gas diffusion electrode membrane and the anion-exchange resin precursor membrane.

8. The production method as set forth in claim 6 or 7, wherein
the quaternary base forming functional group is a halogen atom containing organic group; and the functional group of the polyfunctional quaternarizing agent is an organic group including an atom having a lone pair of electrons.

9. The production method as set forth in claim 6 or 7, wherein
the quaternary base forming functional group is an organic group including an atom having a lone pair of electrons; and the functional group of the polyfunctional quaternarizing agent is a halogen atom containing organic group.

10. A production method of a hydroxide ion-based electrolyte membrane-electrode membrane assembly for a solid polymer fuel cell, wherein
in a gas electrolyte membrane-electrode membrane assembly for a solid polymer fuel cell obtained by the production method as set forth in any one of claims 6 to 9, a counter anion of the quaternary base anion-exchange group of the anion-exchange resins forming the gas diffusion electrode membrane and the solid electrolyte membrane, is further substituted with a hydroxide ion.

11. The production method as set forth in any one of claims 6 to 10, wherein
the polyfunctional quaternarizing agent is a bifunctional quaternarizing agent.

* * * * *